United States Patent
Krampf et al.

(10) Patent No.: US 9,427,906 B2
(45) Date of Patent: Aug. 30, 2016

(54) COOLING DEVICE

(75) Inventors: Nikolaus Krampf, Bad Oeynhausen (DE); Kurt Huth, Bobingen (DE)

(73) Assignee: BATTENFELD-CINCINNATI GERMANY GMBH, Bad Oeynhausen (DE)

( * ) Notice: Subject to any disclaimer, the term of this patent is extended or adjusted under 35 U.S.C. 154(b) by 909 days.

(21) Appl. No.: 11/137,762

(22) Filed: May 25, 2005

(65) Prior Publication Data

US 2005/0263939 A1 Dec. 1, 2005

(30) Foreign Application Priority Data

May 27, 2004 (DE) .................. 10 2004 026 027

(51) Int. Cl.
*B29C 47/90* (2006.01)
*B29C 47/88* (2006.01)
*B29C 47/00* (2006.01)

(52) U.S. Cl.
CPC ......... *B29C 47/886* (2013.01); *B29C 47/0021* (2013.01); *B29C 47/90* (2013.01); *B29C 47/906* (2013.01); *B29C 47/8815* (2013.01); *B29C 47/8845* (2013.01); *B29C 47/8855* (2013.01)

(58) Field of Classification Search
CPC . B29C 47/0021; B29C 47/906; B29C 47/90; B29C 47/886; B29C 47/8815; B29C 47/8845; B29C 47/8855
USPC ......... 425/66, 325, 340, 343, 356, 362, 367, 425/384, DIG. 41; 264/175, 210.1
See application file for complete search history.

(56) References Cited

U.S. PATENT DOCUMENTS

| | | | | | |
|---|---|---|---|---|---|
| 3,810,729 | A | * | 5/1974 | Patchell | 425/308 |
| 3,935,047 | A | * | 1/1976 | Shinomura | 156/163 |
| 3,989,572 | A | * | 11/1976 | Swartz | 156/252 |
| 3,999,911 | A | * | 12/1976 | Matsubara | 425/73 |
| 4,548,778 | A | * | 10/1985 | Fujii | 264/180 |
| 4,556,527 | A | * | 12/1985 | Sarcander | 264/171.13 |
| 4,629,061 | A | * | 12/1986 | Crandall | 198/807 |
| 4,681,033 | A | * | 7/1987 | Crandall et al. | 100/118 |
| 4,696,779 | A | * | 9/1987 | Wideman | 264/211.13 |
| 4,747,991 | A | * | 5/1988 | Bishop | 264/504 |
| 4,898,013 | A | * | 2/1990 | Mazodier et al. | 72/165 |

(Continued)

FOREIGN PATENT DOCUMENTS

| | | | | | |
|---|---|---|---|---|---|
| JP | 05104647 | A | * | 4/1993 | B29C 67/14 |
| JP | 05309679 | A | * | 11/1993 | B29C 43/24 |

*Primary Examiner* — Seyed Masoud Malekzadeh
(74) *Attorney, Agent, or Firm* — Leydig, Voit & Mayer, Ltd.

(57) ABSTRACT

The invention relates to a device for calibrating and cooling a film or sheet of plastic which comprises at least two cooling or calibrating rolls (1), the rolls being followed by a downstream cooling zone (7). According to the invention, it is in this case provided that the downstream cooling zone (7) comprises pairs of rolls (2, 3, 4) arranged one behind the other. The invention also relates to a method for calibrating and cooling a film or sheet of plastic which comprises the steps of: introducing a film coming from a slot die into the nip between two cooling or calibrating rolls (1), polishing the film (5) between the two cooling or calibrating rolls (1), cooling the film (5) in a cooling zone (7). Here it is provided according to the invention that the cooling zone (7) comprises a number of adjustable rolls, the rolls being arranged in such a way that, at every operating point of the extrusion installation, the cooling of the film (5) largely corresponds to the theoretical thermal conductivity of the film (5).

18 Claims, 5 Drawing Sheets

(56) References Cited

U.S. PATENT DOCUMENTS

| | | | |
|---|---|---|---|
| 5,001,950 A * | 3/1991 | Fokos et al. | 83/37 |
| 5,188,691 A * | 2/1993 | Caputo | 156/145 |
| 5,425,959 A * | 6/1995 | Manser | A21C 11/16 425/301 |
| 5,445,701 A * | 8/1995 | Koba et al. | 156/441 |
| 5,660,901 A * | 8/1997 | Wong | 428/35.7 |
| 5,885,522 A * | 3/1999 | Giannini et al. | 266/90 |
| 5,925,299 A * | 7/1999 | Dierckes et al. | 264/154 |
| 5,968,293 A * | 10/1999 | Giannini et al. | 148/508 |
| 6,071,110 A * | 6/2000 | Mikkelsen | 425/327 |
| 6,074,192 A * | 6/2000 | Mikkelsen | 425/327 |
| 6,187,422 B1 * | 2/2001 | Murschall et al. | 428/220 |
| 6,260,887 B1 * | 7/2001 | Fujii et al. | 264/284 |
| 7,097,003 B2 * | 8/2006 | Reynolds et al. | 187/351 |
| 2002/0068515 A1 * | 6/2002 | Butfering et al. | 451/119 |
| 2002/0074691 A1 * | 6/2002 | Mortellite et al. | 264/288.4 |
| 2003/0047271 A1 * | 3/2003 | Wu et al. | 156/229 |
| 2003/0197298 A1 * | 10/2003 | Hegishi et al. | 264/40.6 |
| 2004/0104496 A1 * | 6/2004 | Arai et al. | 264/28 |
| 2005/0003154 A1 * | 1/2005 | White et al. | 428/141 |
| 2005/0045699 A1 * | 3/2005 | Konishi et al. | 228/214 |
| 2005/0056069 A1 * | 3/2005 | Thiel et al. | 72/247 |
| 2005/0248051 A1 * | 11/2005 | Cancio et al. | 264/154 |

* cited by examiner

COOLING DEVICE

CROSS REFERENCE TO RELATED APPLICATIONS

The present application claims the benefit of the filing date of German Application No. 10 2004 026 027.3, filed on May 27, 2004.

BACKGROUND OF THE INVENTION

1. Field of the Invention

The invention relates to a device for calibrating and cooling a film or sheet of plastic which comprises at least two cooling or calibrating rolls, the rolls being followed by a downstream cooling zone, and also relates to a method for this.

2. Description of Prior Art

Known calibrating and cooling devices comprise, for example, a 3-roll polishing stack with a polishing roll and two cooling rolls. It operates as follows: the film runs out of the slot die into the nip between the polishing roll and the first cooling roll and is polished there. Subsequently, it runs further on the circumference of the second roll (first cooling roll)—cooling of the first side of the film—referred to as single-sided cooling. Then it runs into the 2nd nip between the second roll and the third roll and is sometimes smoothed there again. After that, it runs on the circumference of the third roll (second cooling roll)—cooling of the second side of the film—here once again single-sided cooling.

Therefore, there is the problem that, depending on the speed of the film, the thickness of the film and the geometry of the rolls (diameter), the film is intensely cooled on one side on the first cooling roll—sometimes beyond half the film thickness—so that in any event stresses may be frozen in the film and possibly lead to warpage of the end product during later processing. This phenomenon is repeated, to a rather lesser extent, on the second side. The polishing stack is therefore designed for a specific throughput and/or product range and can only be changed or corrected later with great effort. It is only possible to a limited extent to increase the output. A high cooling rate of the film, and consequently a desired high level of transparency of the film, is achieved only at a narrowly defined operating point.

There are also 3-roll polishing stacks of this type with an adjustable 3rd roll, the second cooling roll being arranged rotatably about the first cooling roll (usual angle of rotation about 130°).

The film once again runs out of the slot die into the nip between the polishing roll and the first cooling roll and is polished there. Subsequently, it runs further on the circumference of the second roll (first cooling roll)—cooling of the first side of the film—single-sided cooling. In this case, the dwell time, and consequently the cooling time, of the film on the roll can be set within certain limits by the position of the 2nd cooling roll with respect to the first cooling roll. Then it runs into the 2nd nip between the second roll and the third roll—and is sometimes smoothed there again. Subsequently, it runs on the circumference of the third roll (second cooling roll)—cooling of the second side of the film—again single-sided cooling. The contact length of the film on the 2nd cooling roll can sometimes likewise be influenced by an adjustable take-off roll. The variable arrangement of the second cooling roll, and possibly a take-off roll, makes the operating range more variable than in the case of a fixed roll arrangement. The cooling rate can be set for a greater range of thicknesses of the film. This also allows a high level of transparency of the film to be achieved over a greater range.

However, higher costs are incurred as a result of the additionally necessary mechanical equipment. A "more flexible" construction is obtained. There is a greater operating range than in the case of the conventional 3-roll polishing stack, but even with this polishing stack the operating range is restricted on account of the geometrical conditions.

Also known are belt polishing units, comprising 2 belts lying opposite each other, in which the film runs from the slot die into a gap that is formed by two circulating belts lying opposite each other and running parallel to each other, is polished between the two belts and symmetrically cooled on both sides. The film is polished on both sides and contains little stress.

The problem with this system is that the belt polishing unit can only be designed for a very narrow working range. Changing the output is not possible on account of the mechanical conditions. The width of the belt polishing unit is restricted on account of the technical possibilities and the production of wide belts with a high surface quality of great planarity is difficult and expensive. The amount of heat to be dissipated increases in proportion to the width of the belt. The side surfaces available for pipework are constant, so it becomes disproportionately more difficult to guide the belt and absorb the nip pressures as the width of the belt increases (bending beam). Furthermore, the tensioning of the belt becomes disproportionately more difficult as the width increases—sagging of the deflecting roll. A reduction of the film width (congruence) is not possible. On account of the necessary sliding surfaces for guiding the belt and absorbing the nip pressures, the system wears very quickly.

These devices can be combined, so as to create a 3-roll polishing stack and a belt polishing unit comprising one polishing roll, two cooling rolls and one or two belts, which cool the film on the side respectively lying outward on the circumferential surface of the cooling rolls.

Here too the film runs out from the slot die into the nip between the polishing roll and the first cooling roll—and is polished there. Then it runs further on the circumference of the second roll (first cooling roll)—cooling of the first side of the film—the film is simultaneously further polished and cooled on the other side of the film by the belt lying against the outer side of the film. It runs into the 2nd nip between the second roll and the third roll—is sometimes polished there once again and then runs on the circumference of the third roll (second cooling roll)—cooling of the second side of the film—here too the cooling and smoothing of the outer side of the film takes place simultaneously by the belt lying against it.

The guiding of the belts parallel to the circumference of the rolls is more difficult than straight guidance, since the temperature-dependent changes in diameter of the roll also have to be taken into account in addition to the problems of precision production of the belts. As a result of the problems in the production and operation of the belts, here too the belt width is restricted. The polishing unit is designed for a specific throughput and/or product range and can only be changed or corrected later with great effort. It is only possible to a limited extent to increase the output. A high cooling rate of the film, and consequently a desired high level of transparency of the film, is achieved only at a narrowly defined operating point.

SUMMARY OF THE INVENTION

The object of the invention is therefore to offer a device and a method with which the disadvantages described above are avoided, in particular a high cooling rate can be achieved.

The object relating to the device is achieved in conjunction with the preamble of claim 1 by a solution wherein the downstream cooling zone comprises pairs of rolls arranged one behind the other. This allows the film to be cooled and formed over a longer zone.

Advantageously, a number of pairs of rolls are combined into modules. Modules preferably comprise six or four pairs of rolls.

According to a development, the rolls of the pairs of rolls and/or the pairs of rolls themselves are adjustable in relation to one another. By this embodiment it is possible to provide the film with an individual passage through the rolls that are arranged, it also being possible for example to achieve adapted cooling. The rolls can be driven individually or together, beneficially affecting the passage of the film.

The rolls are advantageously temperature-controlled. This can be achieved by interior cooling with media by means of water, air, gas or oil.

A further advantage of the device according to the invention is offered by the possibility of making the individual rolls have the same surface quality or different surface qualities, which could be used for example for the first four pairs of rolls.

The pairs of rolls combined into modules are adjustable in relation to the calibration in the direction of extrusion. They may, however, also be adjusted in relation to calibration perpendicularly to the direction of extrusion. The modules that can in this way be arranged in series with one another can be continued as desired, according to requirements, in the extrusion line.

A scissors-type guide or linear guides is/are proposed as guidance for the rolls. For the adjustment of the rolls, which is preferably intended to be symmetrical, or else for the adjustment of the modules, pneumatic cylinders, hydraulic cylinders or spindles are proposed. For applying nip pressures, for example between a calibrating roll and the first cooling roll, the rolls are provided with reinforced mounting.

The object relating to the method is achieved in conjunction with the preamble of claim 11 by a solution wherein the cooling zone comprises a number of adjustable rolls, the rolls being arranged in such a way that, at every operating point of the extrusion installation, the cooling of the film largely corresponds to the theoretical thermal conductivity of the film. Consequently, a high cooling rate is achieved with this method, since the arrangement of the rolls can be adapted individually to the film to be produced.

A device according to the invention is schematically shown in the drawings.

BRIEF DESCRIPTION OF THE DRAWINGS

FIG. 1 shows the cooling device with the rolls adjusted for the web to pass directly through.

DETAILED DESCRIPTION OF THE PREFERRED EMBODIMENT

Figure 1:
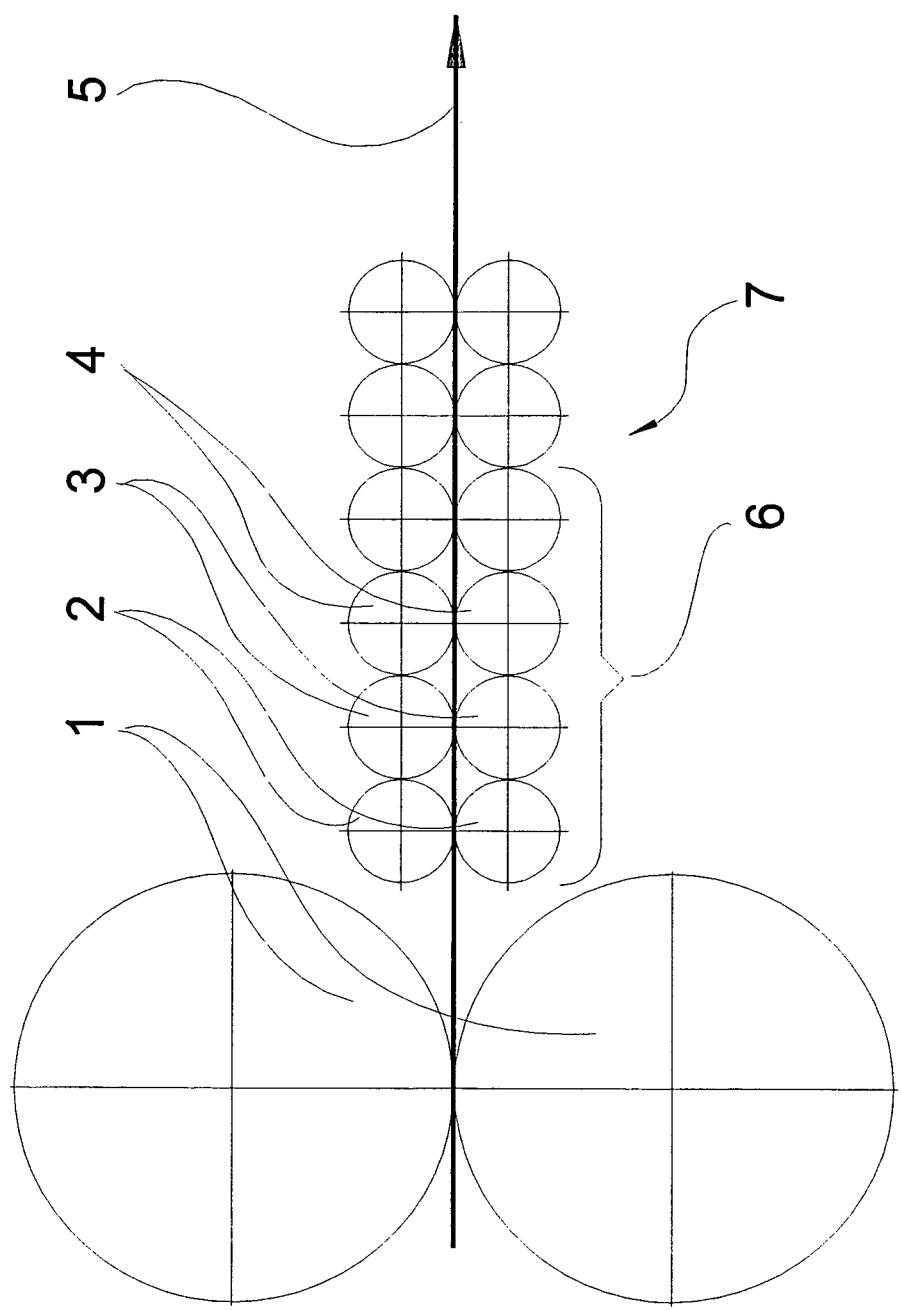

FIG. 1 shows the two cooling or calibrating rolls 1, into the nip of which the film is introduced from a slot die (not represented). The cooling zone 7 comprises a number of pairs of rolls 2, 3, 4, a number of pairs of rolls being combined into a module 6. The arrangement of the pairs of rolls is chosen such that a roll nip for the film 5 to pass through is formed. Although not shown in FIG. 1, the rolls can be driven individually or together, to beneficially affect the passage of the film. Additionally, the rolls are advantageously temperature-controlled. This can be achieved by interior cooling with a temperature controlled media such as water, air, gas or oil. A further advantage of the device according to the present invention is the possibility of making the individual rolls have the same surface quality or different surface qualities, which could be used for example for the first four pairs of rolls.

Figure 2:
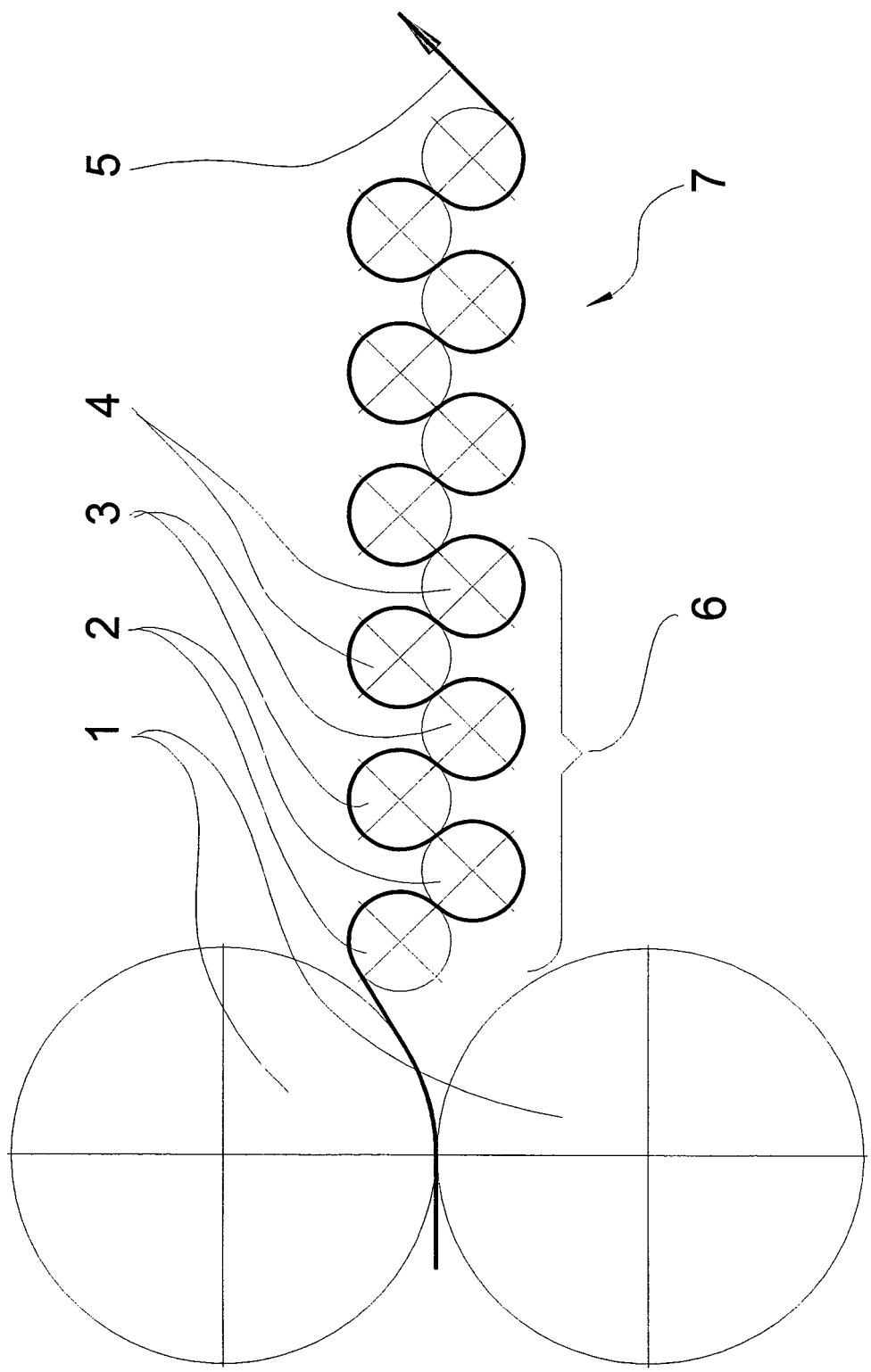
FIG. 2 shows the device with the rolls adjusted so the web runs around the rolls.
Figure 3:
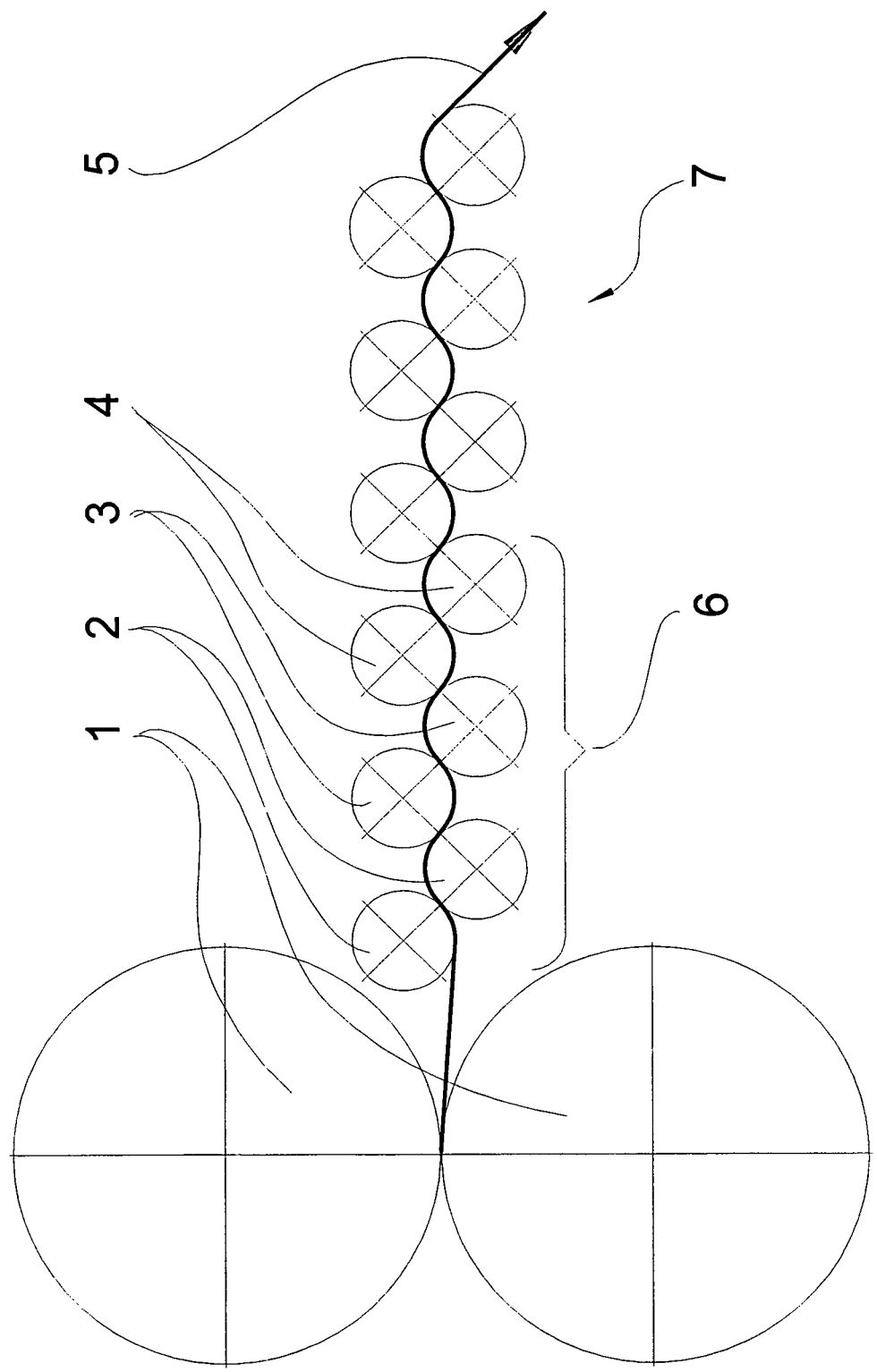
FIG. 3 shows the device with the rolls adjusted so that the web passes approximately through the device.

By contrast with this, in FIG. 2 the arrangement of the pairs of rolls is chosen to be offset. This makes the cooling zone 7 longer. The film 5 can now be passed over this arrangement of the pairs of rolls in such a way that it virtually runs around all the rolls or, as represented in FIG. 3, only passes between the rolls. In both FIGS. 2 and 3 there can again be seen the two cooling/calibrating rolls 1, from where the film 5 is guided through the cooling zone 7 over the rolls 2, 3, 4 that are combined as module 6.

Figure 4:
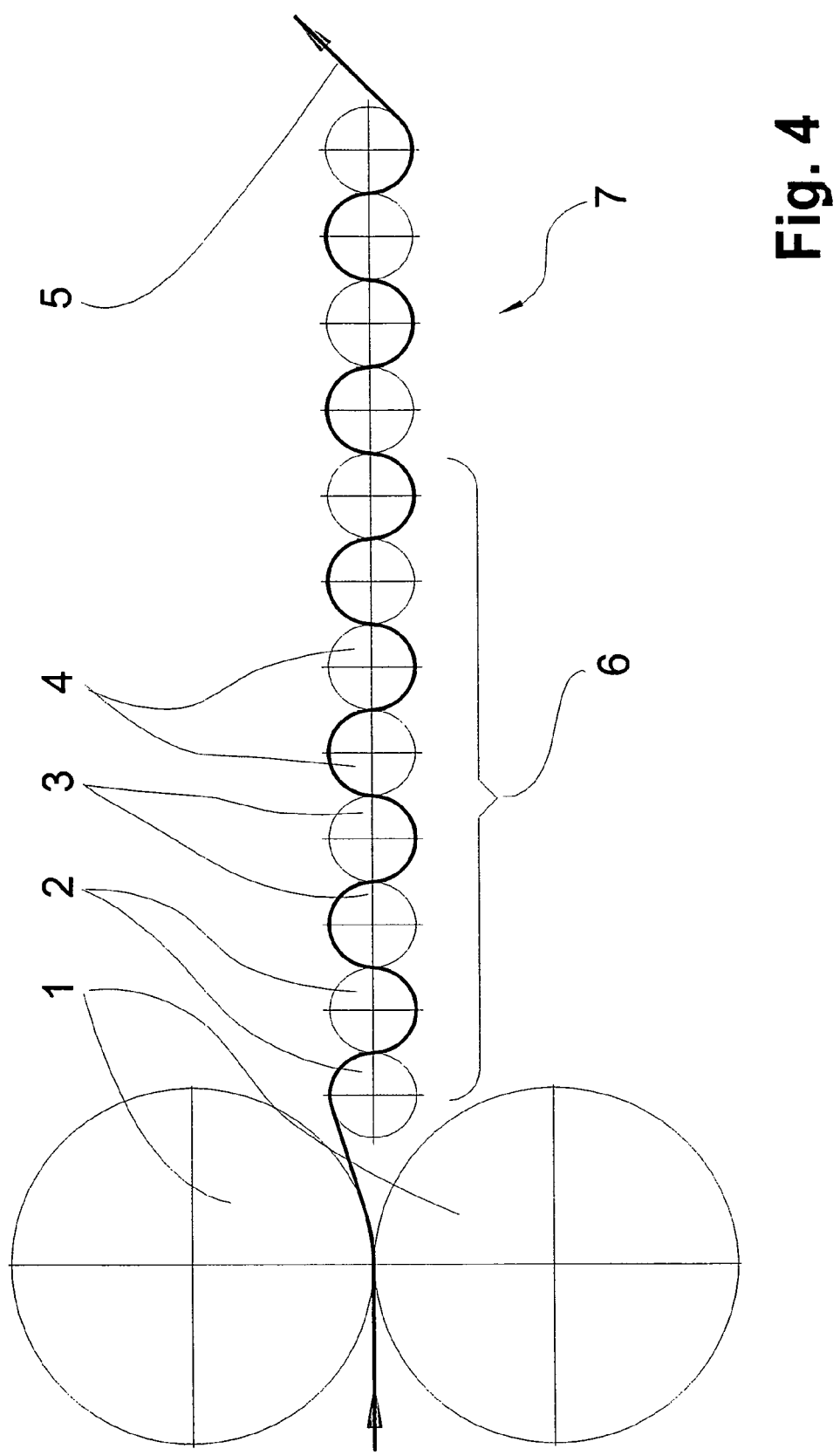
FIG. 4 shows the device with the rolls arranged in series.
Figure 5B:
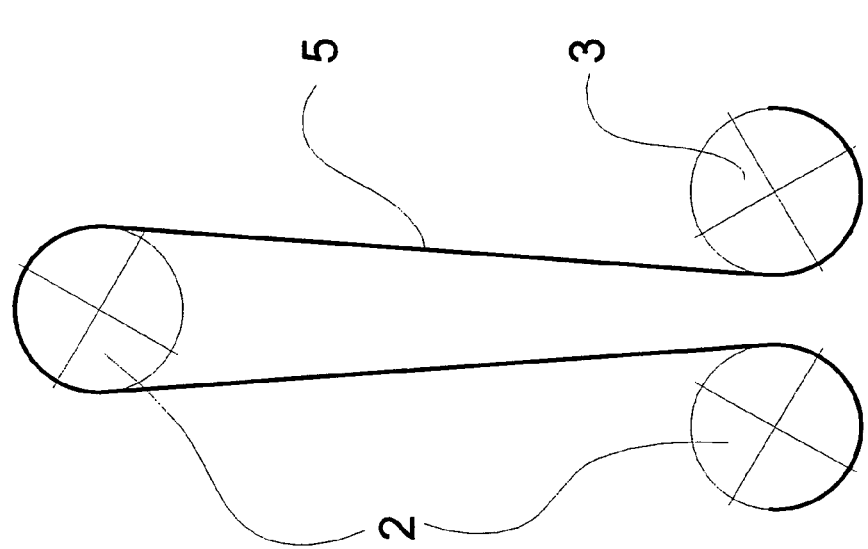
FIG. 5 including FIGS. 5*a* and 5*b* Shows examples of roll pair adjustments.
Figure 5A:
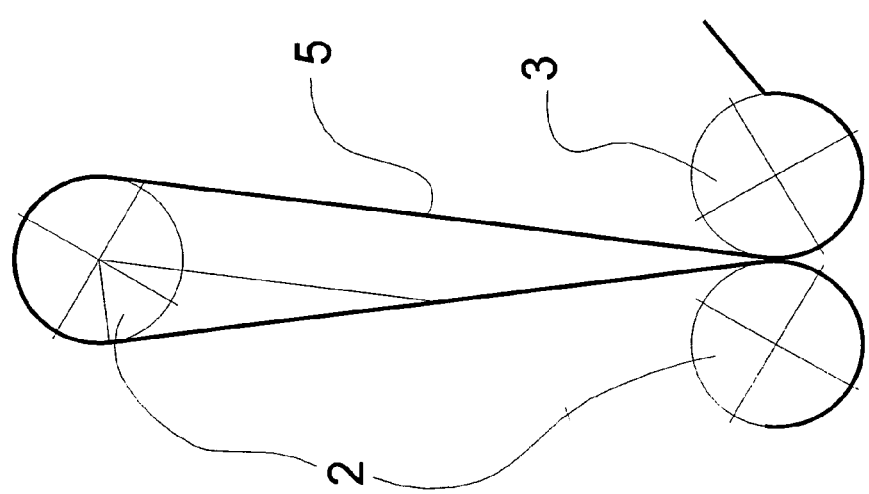

Another arrangement of the cooling zone is shown in FIG. 4. The cooling zone 7 is arranged downstream of the cooling/calibrating rolls 1, the pairs of rolls being combined into a module 6. The film 5 is guided through from the nip between the cooling and calibrating rolls 1 around the rolls 2, 3, 4 etc. The film virtually wraps itself around the rolls. If further influencing of the temperature of the film is required, for example time for temperature equalization between two rolls, two successive rolls may be respectively moved further apart, as is represented in FIG. 5. FIG. 5*a* differs from FIG. 5*b* in that the lower pairs of rolls lie closer together. A scissors-type guide or linear guides is/are proposed as guidance for the rolls. For the adjustment of the rolls, which is preferably intended to be symmetrical, or else for the adjustment of the modules, pneumatic cylinders, hydraulic cylinders or spindles are proposed. For applying nip pressures, for example between a calibrating roll and the first cooling roll, the rolls are provided with reinforced mounting.

It is consequently shown that the film can run from the slot die into the nip between two polishing rolls, where it is polished. The film runs further in the device, in which pairs of rolls are arranged one behind the other. The rolls are adjustable in relation to one another in such a way that all the roll arrangements, from virtually passing through the roll nips to virtually running around the rolls, alternately with or without a temperature-control zone, are possible in all combinations. The rolls are optimally arranged in modules, four pairs or six pairs being preferred. These modules are displaceable in relation to the polishing rolls, so that the arrangement of the rolls in relation to one another (upper to lower row of rolls) and in relation to the calibrating rolls can be changed during operation.

This has the advantage that, by the different arrangement of the cooling rolls, the temperature control of the film can be organized in such a way that, at virtually every operating point of the extrusion installation, the cooling of the film corresponds to the theoretical thermal conductivity of the film. In this way, quickest possible cooling is possible, which achieves a high level of transparency of the film, since the crystallization can be influenced very well. The low bending of the film, caused by lower internal stresses, provides better planarity and consequently a better quality of the film. The film is symmetrically cooled, it sometimes being possible as a result to ignore the existing slight offset of two rolls of a pair with respect to the arrangement with two large cooling rolls. A further advantage is that the cooling zone can be made up of tried-and-tested, inexpensive standard elements (cooling rolls). Adaptation to a higher output of the installation can easily take place by arranging a number of modules in series, and does not have to be achieved by making the installation wider.

It will be understood by those generally familiar with handling plastic webs that the particular embodiments of the invention disclosed in this document are illustrative and are in no way meant to limit the invention. Numerous changes and modifications may be made and the full use of equivalents made without departing from the spirit or scope of the invention as defined in the following claims.

We claim:

1. A device for calibrating and cooling an extruded plastic film or sheet from an extrusion slot die, the device comprising:
    an extruder;
    an extrusion slot die;
    a first calibrating roll;
    a second calibrating roll; and
    a cooling zone,
    wherein the first and second calibrating rolls form a roll nip into which an upper and lower surface of the extruded plastic film or sheet are simultaneously introduced from the extrusion slot die,
    wherein the first and second calibrating rolls are followed in a downstream direction by the cooling zone,
    wherein the cooling zone comprises pairs of rolls configured to directly contact the extruded plastic film or sheet,
    wherein the pairs of rolls are arranged one behind the other, and are arranged offset from each other, in the downstream direction configured to form a longer cooling zone, wherein the pairs of rolls are combined into modules.

2. The device of claim 1, wherein each roll in each pair of rolls is adjustable in position with respect to the other roll of the pair, and wherein each pair of the pairs of rolls is adjustable in position in relation to one another.

3. The device of claim 2, wherein the calibrating rolls and the rolls in each roll pair can be driven individually.

4. The device of claim 3, wherein the calibrating rolls and the rolls in each roll pair are temperature-controlled.

5. The device of claim 4, wherein the calibrating rolls and the rolls in each roll pair are internally cooled with a medium.

6. The device of claim 1, wherein the calibrating rolls and the rolls in each roll pair comprise the same surface.

7. The device of claim 1, wherein the calibrating rolls and the rolls in each roll pair comprise different surfaces.

8. The device of claim 1, wherein the modules are adjustable in the downstream direction.

9. The device of claim 1, wherein the modules are adjustable perpendicularly to the downstream direction.

10. The device of claim 1, comprising four of the pairs of rolls.

11. The device of claim 1, comprising six of the pairs of rolls.

12. The device of claim 1, comprising a further calibrating roll.

13. The device of claim 1, wherein the first and second calibrating rolls have substantially the same cross-sectional diameter.

14. The device of claim 1, wherein the first and second calibrating rolls and the rolls in each roll pair can be driven together.

15. The device of claim 1, wherein the calibrating rolls are driven individually.

16. The device of claim 1, wherein the rolls in each roll pair are driven individually.

17. The device of claim 1, wherein the rolls in each roll pair are driven together.

18. The device of claim 3, wherein the rolls in each roll pair are temperature-controlled.

* * * * *